US007643991B2

(12) United States Patent
Haritaoglu et al.

(10) Patent No.: US 7,643,991 B2
(45) Date of Patent: Jan. 5, 2010

(54) SPEECH ENHANCEMENT FOR ELECTRONIC VOICED MESSAGES

(75) Inventors: Recep Ismail Haritaoglu, Sunnyvale, CA (US); Paula Kwit, Austin, TX (US); Robert Bruce Mahaffey, Austin, TX (US); Thomas Guthrie Zimmerman, Cupertino, CA (US)

(73) Assignee: Nuance Communications, Inc., Burlington, MA (US)

( * ) Notice: Subject to any disclaimer, the term of this patent is extended or adjusted under 35 U.S.C. 154(b) by 877 days.

(21) Appl. No.: 10/916,975

(22) Filed: Aug. 12, 2004

(65) Prior Publication Data

US 2006/0036439 A1 Feb. 16, 2006

(51) Int. Cl.
*G01L 19/14* (2006.01)
*G01L 21/02* (2006.01)
*G01L 21/04* (2006.01)

(52) U.S. Cl. ....................... 704/224; 704/211; 704/225; 704/226; 704/503

(58) Field of Classification Search .................. 704/261
See application file for complete search history.

(56) References Cited

U.S. PATENT DOCUMENTS

| | | | | |
|---|---|---|---|---|
| 5,742,927 | A * | 4/1998 | Crozier et al. | 704/226 |
| 7,065,485 | B1 * | 6/2006 | Chong-White et al. | 704/208 |
| 7,110,951 | B1 * | 9/2006 | Lemelson et al. | 704/270 |
| 7,251,781 | B2 * | 7/2007 | Batchilo et al. | 715/210 |
| 2002/0173950 | A1 * | 11/2002 | Vierthaler | 704/208 |
| 2003/0236658 | A1 * | 12/2003 | Yam | 704/2 |
| 2004/0024591 | A1 * | 2/2004 | Boillot et al. | 704/209 |
| 2004/0117189 | A1 * | 6/2004 | Bennett | 704/270.1 |
| 2004/0122656 | A1 * | 6/2004 | Abir | 704/4 |
| 2006/0178876 | A1 * | 8/2006 | Sato et al. | 704/225 |

FOREIGN PATENT DOCUMENTS

JP 05027792 A * 2/1993

OTHER PUBLICATIONS

Revoile et al., "Speech Cue Enhancement for the Hearing Impared: Altered Vowel Durations for Perception of Final Fricative Voicing", Journal of Speech and Hearing Research, vol. 29, 240-255, Jun. 1986.*

Montgomery et al., "Evaluation of Two Speech Enhancement Techniques to Improve Intelligibility for Hearing-Impaired Adults", Journal of Speech and Hearing Research, vol. 31, 386-393, Sep. 1988.*

Scienfitic Learning Corporation, "Fast ForWord Products by Scientific Learning Improve Reading and Language Skills Fast"; 1997-2004; www.scientificlearning.com/ ; Scientific Learning Corp.; U.S. A.

Scienfitic Learning Corporation, "Fast ForWord Products by Scientific Learning"; 1997-2004; www.scientificlearning.com/prod/mainbp=; Scientific Learning Corp.; U.S.A.

* cited by examiner

*Primary Examiner*—David R Hudspeth
*Assistant Examiner*—Brian L Albertalli
(74) *Attorney, Agent, or Firm*—Wolf, Greenfield & Sacks, P.C.

(57) ABSTRACT

The present invention provides for processing voice data. The vocalic of at least one word associated with the electronic voice signal is elongated. The magnitude of at least one consonant spike of the at least one word associated with the electronic voice signal is increased. Through the emphasis of the consonants, intelligibility of speech is increased.

12 Claims, 4 Drawing Sheets

SPEECH ENHANCEMENT FOR ELECTRONIC VOICED MESSAGES

TECHNICAL FIELD

The present invention relates generally to speech enhancement and, more particularly, to speech enhancement in electronic voice systems.

BACKGROUND

When communicating orally, especially with the intermediate use of electronic devices, intelligibility can be a problem, especially for those with hearing impairments. Some of the problems associated with the use of electronic devices can be acoustic limitations in the processing, and other problems can result from the lack of direct face to face interactions.

There are some conventional processing techniques that have been used to compensate for these problems. These include loudness controls and peak clipping. In other words, increasing the loudness of the signal for the listener, but making sure that the maximum loudness does not exceed a certain level.

When communicating orally, especially with the intermediate use of electronic devices, intelligibility can be a problem, especially for those with hearing impairments or for those in noisy environments. Some of the problems associated with the use of electronic devices can be due to acoustic limitations, and other problems can result from the lack of direct face to face interactions.

There are some conventional processing techniques that have been used to compensate for acoustic problems. These include filtering, loudness controls, and peak clipping. In other words, equalizing the spectrum and increasing the loudness of the signal for the listener, but making sure that the maximum loudness does not exceed a certain level.

However, there are limitations to speech understanding when using these conventional speech-processing techniques. For instance, speech can be spoken to quickly or indistinctly, detracting from intelligibility.

Therefore, there is a need for a system and a method to process speech electronically to addresses at least some of the shortcomings of conventional methods of processing speech.

SUMMARY OF THE INVENTION

The present invention provides for processing voice data. The vocalic of at least one word associated with the electronic voice signal is elongated. The magnitude of at least one consonant spike of the at least one word associated with the electronic voice signal is increased.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
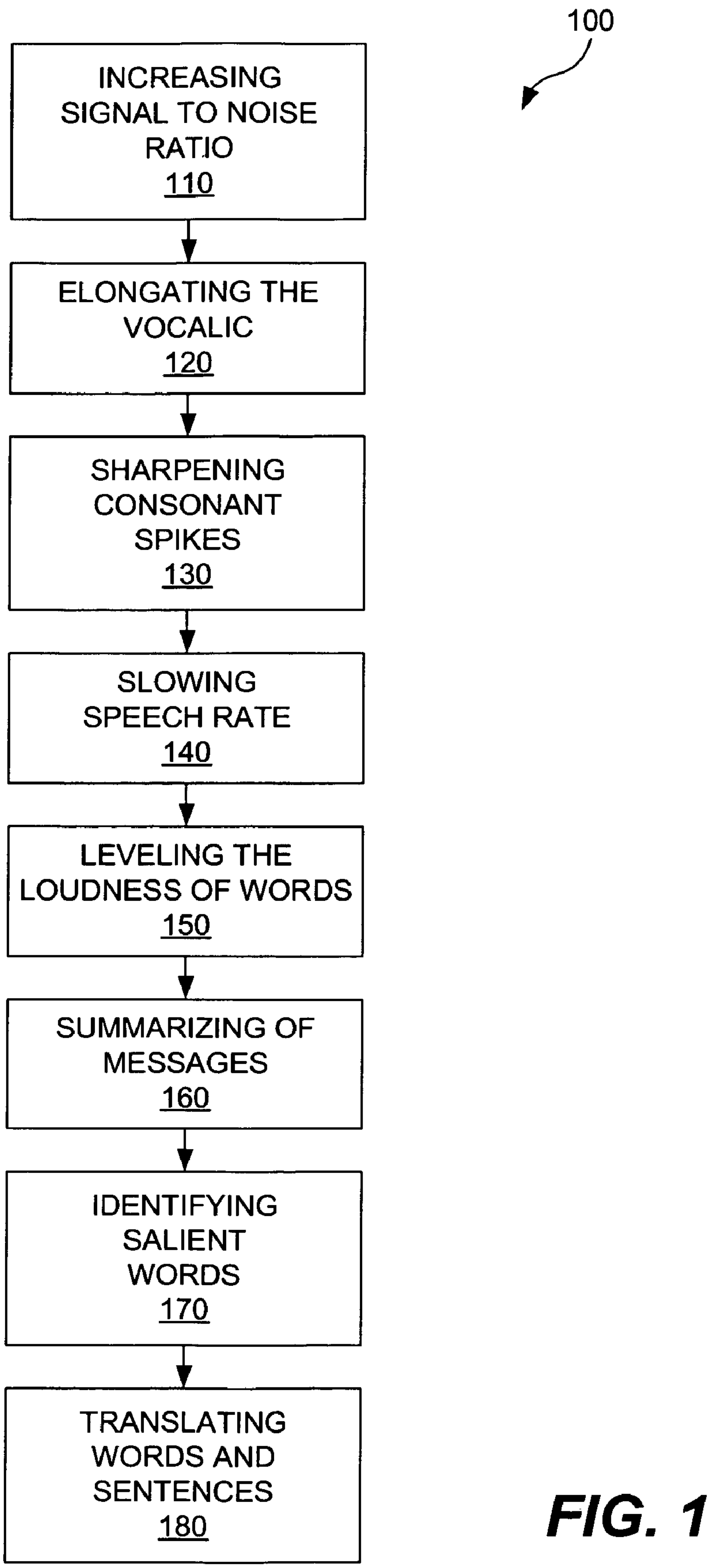
FIG. 1 illustrates a method of processing voice data.

Turning now to FIG. 1, illustrated is a method 100 for processing voice for processing voice speech within FIG. 1 or another voice processing system.

In step 110, the signal to noise ration is increased. The ratio between the ambient noise and peak acoustic signal is the S/N ratio (Signal to noise). When ambient noise increases, it masks the information-bearing signal. This ratio is enhanced by drastically filtering random noise that is outside of the usual speech spectrum and then attenuating the residual noise within the usual speech spectrum with a center clipping technique that reduces most of the noise that would block the perception of speech. If all noise were attenuated within the speech spectrum, major information bearing portions of the speech signal would also be eliminated, so typically noise within the usual speech spectrum is attenuated less than that outside of the usual speech spectrum. This usual speech spectrum varies from language to language and speaker to speaker so for optimal function this is to be finely tuned, but average settings work for most speakers.

In step 120, the vocalic is elongated, thereby giving the listener a longer time to process consonants. In English and most other western languages, information in speech is contained primarily in consonants (e.g. /t/, /d/, /s/) with very little information being contained in vowel sounds, known as vocalics. Vocalics carry information through inflection and timing. Across noisy phone lines, or other transmission, consonants may not be easily detected, resulting in mistakes in speech perception. Processing time is required for the human perceptual system to discern one consonant from another. By computationally elongating the vocalic portion of speech, more time is allowed between the occurrence of consonants. This increases the overall time for a speech segment to be presented, minimizing potential for real time speech enhancement. Elongation can compensate for some of the speech signal lost by increasing the signal to noise ratio.

In step 130, consonant spikes are sharpened, thereby emphasizing the information-carrying content of the words. Many of the information bearing consonants described in 120 are very transient in nature and cause notable peaks in the acoustic signal. When these peaks are accentuated in height, they are more easily perceived, albeit slightly distorted. This is similar to turning a radio's treble control to high setting; it distorts but may improve listening. In the present technique, peaks are detected as rapid changes in voltage or sound pressure. When this is detected the rate of change is increased, resulting in sharpened consonant peaks.

In step 140, the time between words is increased to give the listener time to process each word. When real time speech is not essential, slowing of the entire speech sample may increase comprehension, particularly when language barriers are crossed. The current technique maintains speech at its original fundamental frequency (pitch) and retains original vocal quality. The process relates to vocalic elongation in which individual waveforms of vowels are replicated to increase vowel length. Silent periods between words and possibly syllables are also increased. As with other modifications, real time speech is not possible.

In step 150, the loudness level of words in leveled. In other words, each word is leveled to have the same average loudness as another word. Following steps 110-140, the loudness of words are equalized to an approximate median intensity level. The process attempts to make any words exceeding approximately 350 milliseconds of equal loudness. Very short words, such as "of" are below this duration and are not equalized, thus retaining their relatively low information status in the speech signal. Variable settings can alter what is equalized and what is not.

In a further embodiment, further processing steps are also taken. In step 160, messages are summarized. In other words, group of verbal words are distilled into a single word queue. In step 170, salient, or "key," words are identified. This can be through such means are deleting articles "a" or "the", the deletion of titles, such as "Mr.", "Mrs.", "Ms." And so on. Finally, in step 180, the method 100 can translate between languages.

Functions 160-180 in FIG. 1 generally require that speech be processed into text through existing voice recognition technologies. These techniques exist in current IBM technologies. Summarization restates the text message in a condensed form. Salience identifies the most information-bearing words in the message and highlights them. Translation converts the indicated message into a target language, with the potential for synthesizing into the target spoken language.

Figure 2A:
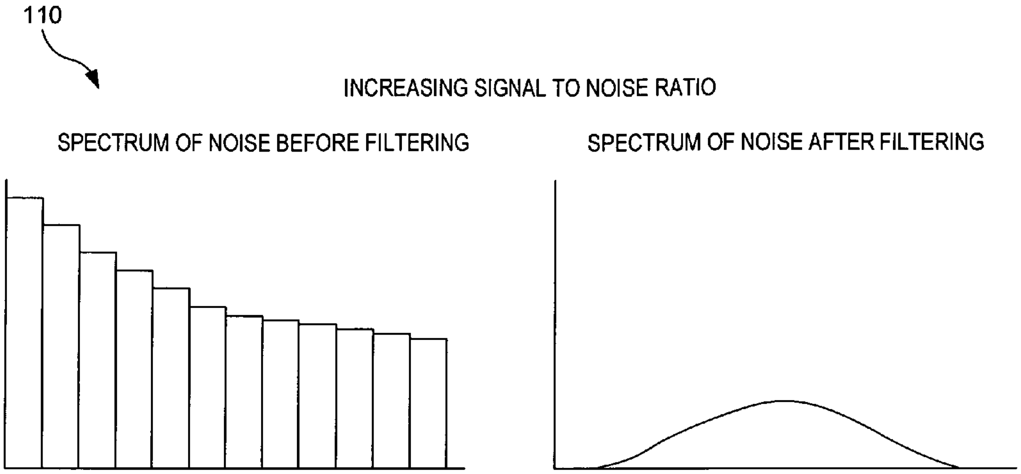
FIGS. 2A-2D represent signal processing performed during various steps of FIG. 1.

Turning to FIG. 2A, illustrated is an example of increasing the signal to noise ratio after filtering. This step can occur in step 110.

Figure 2B:
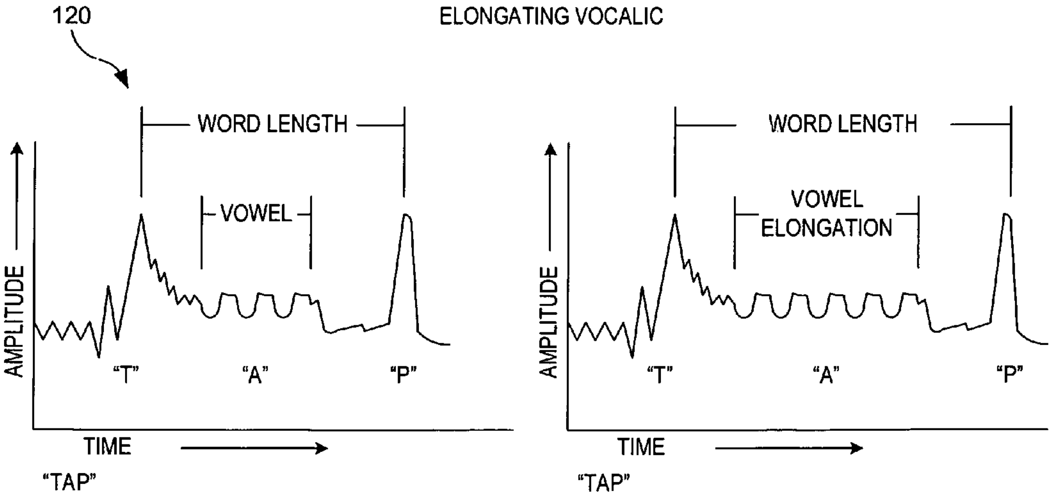

Turning to FIG. 2B, illustrated is an example of elongating a vocalic. This step can occur in step 120.

Figure 2C:
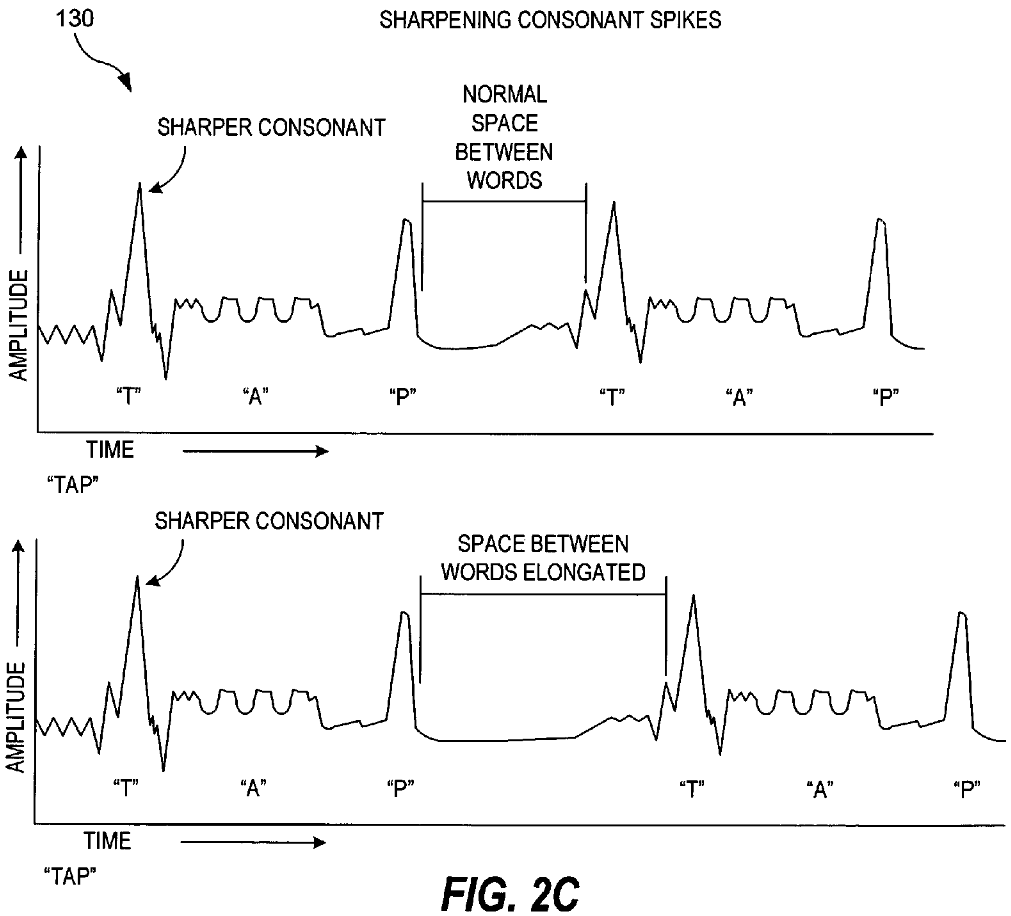

Turning to FIG. 2C, illustrated is an example of sharpening consonant spikes. This step can occur in step 130.

Figure 2D:
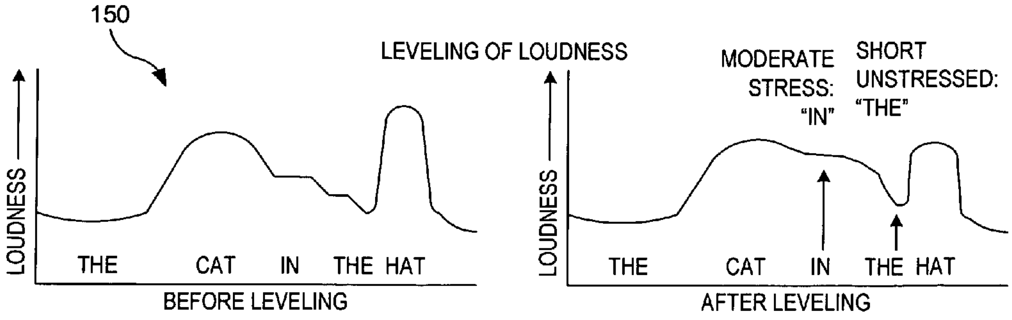

Turning to FIG. 2D, illustrated is a an example of a leveling of loudness. This step can occur in step 150.

Figure 3:
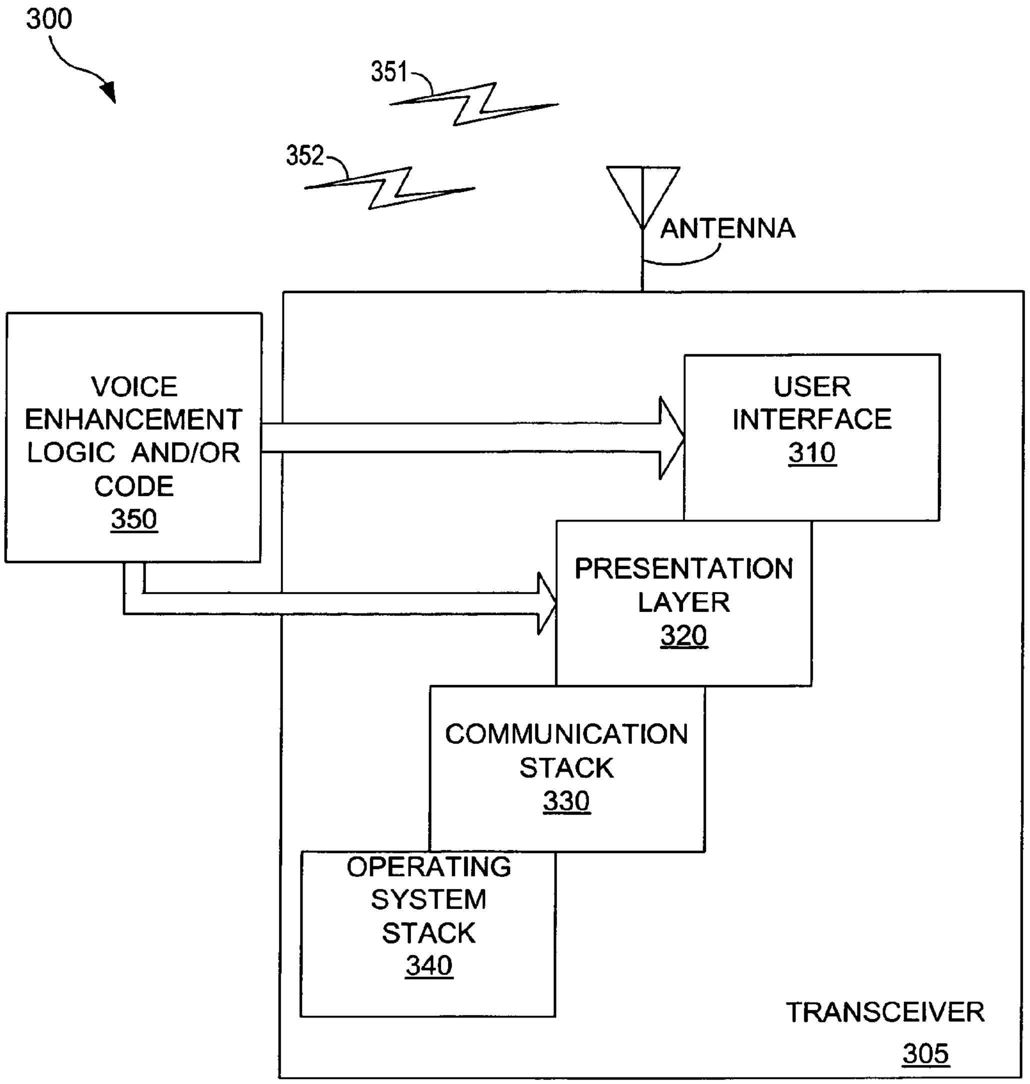
FIG. 3 schematically depicts a system illustrating where, within a stack, data processing of voice data occurs.

Turning to FIG. 3, disclosed is an illustration of a client-server based operating system 300 as illustrated in a transceiver 305. In the system 300, if the enhanced voice data processing takes place at a receiver, the processing occurs at the "user interface" layer 310. However, those of skill in the art understand that the processing can occur in other layers of the system 300 or in a centralized MPU. In any event, language and words are transmitted between a first transmitter or receiver, and received by a transmitter or transceiver. In the system 300, digital acoustic signal processing is performed upon the speech (words) to make the words more intelligible (comprehensible) to the listener. In the system 300, steps 110-150 of the method 100 (FIG. 1) could be performed utilizing a standard telephone as the receiver wherein the acoustic processing is centralized. Alternatively the processing could be performed in a PDA or other processing unit.

In a further embodiment, the processing capability could be added within a personal digital assistant (PDA), or added to a server, depending upon computing power of the PDA, hearing aids, mobile terminals, cockpit communication gear, or other hearing aid devices, in steps 150-180. Using the 7-layer Open Systems Interconnect (OSI) model for packet data communications, the voice processing signal would be processed as voice-recognized into text within the PDA at the $7^{th}$ layer, the user interface layer 310. If the processing is done at a centralized server, the signal processing would be done at the communication stack layer 330, which is at the bottom of the session layer, the $5^{th}$ layer.

Regardless of the layer at which it operates, the system 300 uses certain characteristics of speech to enhance comprehensibility for a listener. In a number of languages, English among them, much of the information in a word is contained in the consonants of a word. Therefore, the system 300 takes a word, and stretches the time between the consonants of the word. In other words, the vowels are stretched during signal processing. This gives the end user more time to process each consonant, which helps with the recognition process by the listener.

In particular, when looking at the volume of a speech signal, consonants tend to be spiked, but vowels tend to behave like a primary sine wave. Therefore, the length of the duration of time of this sine wave is lengthened during the processing in the system, thereby giving the end user more time to process each consonant spike.

A second thing that can happen in the system 300 is that the consonant spikes are "sharpened", to make them more distinct and understandable by the end user. The sharpening occurs in the time domain. In other words, in languages such as English, there is an increase in volume that occurs, a spike in volume, that corresponds to a consonant. In the system 300, the time allotted to represent a given consonant is shortened, thereby making the consonant more distinct over a shorter time period and hence easier to recognize.

In one embodiment, the voice enhancement digital signal processing (DSP) is performed in a wireless system, although the voice enhancement DSP could be done also with a personal digital assistant (PDA). In one embodiment, there are two phone lines between the mobile and the telecom system. In the first phone line, audio signals are taken from the telephone to the server. In the second phone line, processed information is taken from the server and output to the end user. In one embodiment, the speech enhancement is performed at a server.

In any event, voice enhancement digital signal processing can include an increased audio signal to noise level. The voice enhancement digital signal processing can also include elongated vocalic (that is, the "vowel" sound) to improve intelligibility increasing the distances between spikes. The voice enhancement digital signal processing can also include spike sharpening to increase the distinguishability of consonants. The voice enhancement can also include slowed speech rate by adding pauses between words. Finally, the digital signal processing can also include the audio leveling of loudness. However, those of skill in the art understand that other forms of voice digital signal processing are within the scope of the present invention.

In a further embodiment, there is also word technology to improve the intelligibility of words as atomic units. These are include summarization/compaction of messages. In other words, either the server or the client recognizes a phrase, and then gives an indication of what that phrase is rather than the phrase itself. There can also be an identification of salient words, as opposed to every word. For instance, articles, such as "a" or "the" could also be removed. Finally, there is translation from one language to another.

In a further embodiment, the system 300 has a first channel 351 between the transmitting source and the receiving source for carrying audio information. There is also a second channel 352 for transmitting and receiving processing information, such as is used by the steps 110-180. This is both used by the system 300 to process the audio information for the end user in accordance with the method 100.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A computer-implemented method for processing voice data, comprising:
- elongating a vocalic of at least one word associated with an electronic voice signal by increasing a distance between spikes;
- increasing a magnitude of at least one consonant spike of the at least one word associated with the electronic voice signal; and
- increasing the time lapse between separate words.

2. A computer-implemented method for processing voice data, comprising:
- elongating a vocalic of at least one word associated with an electronic voice signal by increasing a distance between spikes;
- increasing a magnitude of at least one consonant spike of the at least one word associated with the electronic voice signal; and
- summarizing two or more words into one word.

3. A computer-implemented method for processing voice data, comprising:
- elongating a vocalic of at least one word associated with an electronic voice signal by increasing a distance between spikes;
- increasing a magnitude of at least one consonant spike of the at least one word associated with the electronic voice signal; and
- transmitting words that do not belong to a predefined set of words.

4. The computer-implemented method of claim 3, wherein one member of the predefined set of words is the word "the".

5. A computer-readable storage medium encoded with computer code for execution on at least one processor, the computer code, when executed on the at least one processor, performing a method for processing voice data, the method comprising acts of:
- elongating a vocalic of at least one word associated with an electronic voice signal by increasing a distance between spikes;
- increasing a magnitude of at least one consonant spike of the at least one word associated with the electronic voice signal; and
- increasing the time lapse between separate words.

6. A computer-readable storage medium encoded with computer code for execution on at least one processor, the computer code, when executed on the at least one processor, performing a method for processing voice data, the method comprising acts of:
- elongating a vocalic of at least one word associated with an electronic voice signal by increasing a distance between spikes;
- increasing a magnitude of at least one consonant spike of the at least one word associated with the electronic voice signal; and
- summarizing two or more words into one word.

7. A computer-readable storage medium encoded with computer code for execution on at least one processor, the computer code, when executed on the at least one processor, performing a method for processing voice data, the method comprising acts of:
- elongating a vocalic of at least one word associated with an electronic voice signal by increasing a distance between spikes;
- increasing a magnitude of at least one consonant spike of the at least one word associated with the electronic voice signal; and
- transmitting words that do not belong to a predefined set of words.

8. The computer-readable storage medium of claim 7, wherein one member of the predefined set of words is the word "the".

9. A system comprising:
- at least one processor, programmed to;
  - elongate a vocalic of at least one word associated with an electronic voice signal by increasing a distance between spikes;
  - increase a magnitude of at least one consonant spike of the at least one word associated with the electronic voice signal; and
  - increase the time lapse between separate words.

10. A system comprising:
- at least one processor, programmed to;
  - elongate a vocalic of at least one word associated with an electronic voice signal by increasing a distance between spikes;
  - increase a magnitude of at least one consonant spike of the at least one word associated with the electronic voice signal; and
- summarize two or more words into one word.

11. A system comprising:
- at least one processor, programmed to;
  - elongate a vocalic of at least one word associated with an electronic voice signal by increasing a distance between spikes;
  - increase a magnitude of at least one consonant spike of the at least one word associated with the electronic voice signal; and
  - transmit words that do not belong to a predefined set of words.

12. The system of claim 11, wherein one member of the predefined set of words is the word "the".

* * * * *

UNITED STATES PATENT AND TRADEMARK OFFICE

CERTIFICATE OF CORRECTION

PATENT NO. : 7,643,991 B2
APPLICATION NO. : 10/916975
DATED : January 5, 2010
INVENTOR(S) : Haritaoglu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1546 days.

Signed and Sealed this

Sixteenth Day of November, 2010

David J. Kappos

*Director of the United States Patent and Trademark Office*